Sept. 29, 1959 E. E. LOEBNER 2,907,001

INFORMATION HANDLING SYSTEMS

Filed Dec. 31, 1956 8 Sheets-Sheet 1

INVENTOR.
EGON E. LOEBNER
BY
ATTORNEY

INVENTOR.
EGON E. LOEBNER
BY Morris A. Rabkin
ATTORNEY

Sept. 29, 1959 E. E. LOEBNER 2,907,001

INFORMATION HANDLING SYSTEMS

Filed Dec. 31, 1956 8 Sheets-Sheet 3

INVENTOR.
EGON E. LOEBNER
BY Morris A. Rabkin
ATTORNEY

INVENTOR.
EGON E. LOEBNER
BY
ATTORNEY

INVENTOR.
EGON E. LOEBNER
BY Morris Rabkin
ATTORNEY

INVENTOR.
EGON E. LOEBNER
BY Morris A. Rabkin
ATTORNEY

Sept. 29, 1959 E. E. LOEBNER 2,907,001
INFORMATION HANDLING SYSTEMS
Filed Dec. 31, 1956 8 Sheets-Sheet 7

INVENTOR.
EGON E. LOEBNER
BY Morris ... [signature]
ATTORNEY

INVENTOR.
EGON E. LOEBNER
BY Morris Rabin
ATTORNEY

United States Patent Office 2,907,001
Patented Sept. 29, 1959

2,907,001

INFORMATION HANDLING SYSTEMS

Egon E. Loebner, Princeton, N.J., assignor to Radio Corporation of America, a corporation of Delaware Application December 31, 1956, Serial No. 631,602
11 Claims. (Cl. 340—173)

This invention relates to information handling systems in which the information signals may be other than electrical.

One form of information handling system in which the information signals are other than electrical is described in the article "Opto-Electronic Devices and Networks," by E. E. Loebner in the Proceedings of the I.R.E. of December 1955, at page 1897. As described in that article, information handling devices and circuits that are based on light radiation signals may be formed from combinations of electroluminescent and photoconductor cells. The phenomenon known as electroluminescence is one occurring in certain phosphor materials that may be caused to emit visible, or near visible, radiations by subjecting them to electrical fields, for example, to alternating electrical fields of a certain magnitude and frequency. A photoconductor is a material which has the property of an electrical impedance that changes in response to incident radiations.

It is among the objects of this invention to provide:

A new and improved information handling system in which the information signals may be other than electrical;

A new and improved information handling system in which the input or output is a radiation signal;

A new and improved information handling system employing electroluminescent and photoconductive cells.

In accordance with this invention, a first electrical series combination includes a first and a second transducer. The first transducer is responsive to signals in an energy form other than electrical for controlling power in electrical form in accordance with those signals. The control is effected by providing a variable impedance in response to the signals. A second transducer converts electrical power to the aforementioned non-electrical form of power, and is connected in a first electrical series combination with the first transducer. A second electrical series combination includes a third and fourth transducer, which are respectively similar to the aforementioned first and second transducers. The second series combination is connected electrically in shunt with the second transducer. Variations in non-electrical power received by the first transducer tend to produce certain variations in the power of the signals generated by the second and fourth transducers in the same direction. Variations in the intensity of signals received by the third transducer tend to produce certain variations in power generated by the second and fourth transducers in opposite directions.

In accordance with one embodiment of this invention, a first electroluminescent cell is connected in a series circuit with a first variable impedance, across which circuit is connected an operating potential source. Connected in shunt across the electroluminescent cell is a series combination that includes a second electroluminescent cell and a second variable impedance. Changes in the impedance of the second variable impedance tend to produce changes in the amount of radiation generated by the first and second electroluminescent element in opposite directions, respectively.

The foregoing and other objects, the advantages and novel features of this invention, as well as the invention itself both as to its organization and mode of operation, may be best understood from the following description, when read in connection with the accompanying drawings, in which like reference numerals refer to like parts, and in which.

Figures 1, 2, 3:
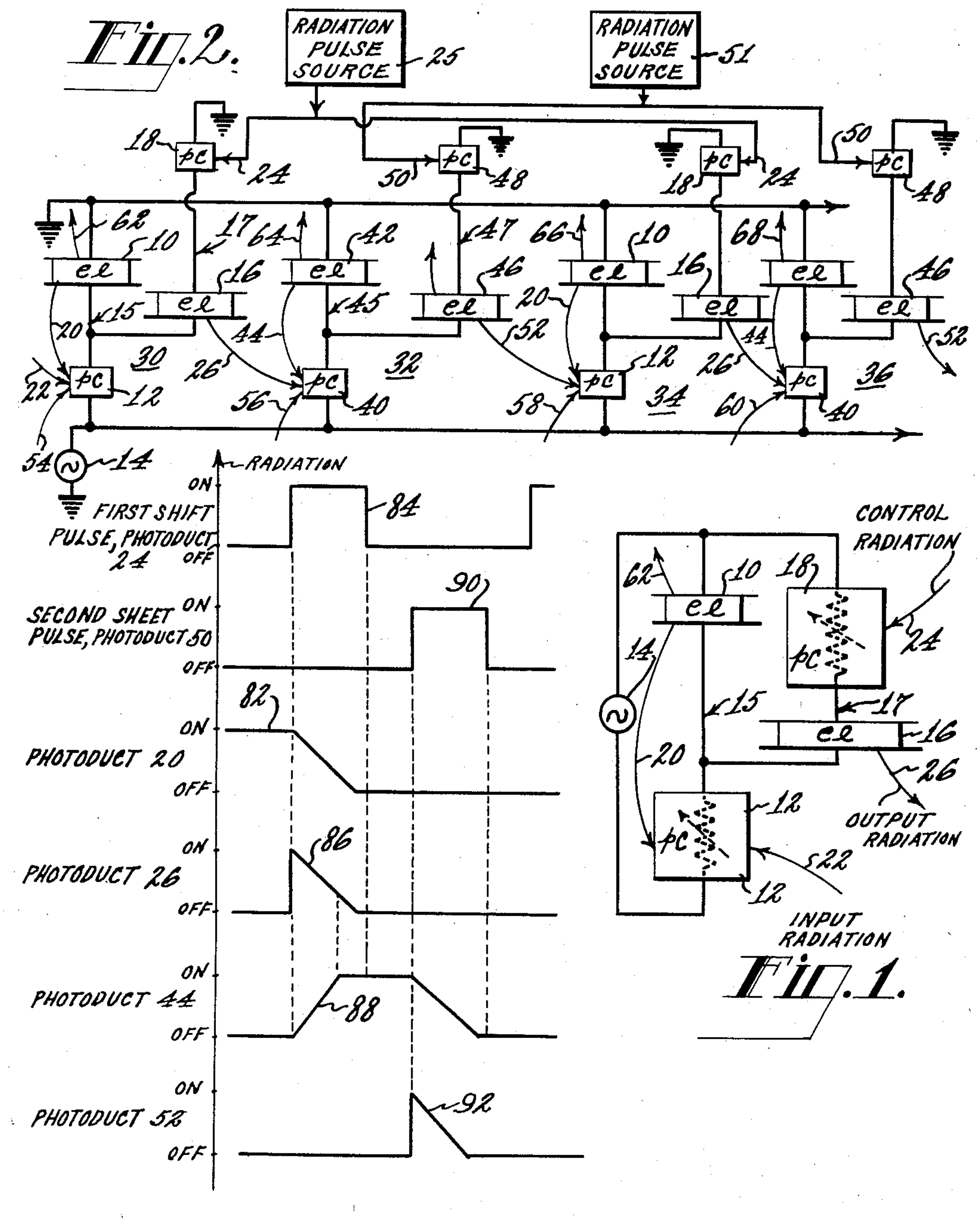
Figure 1 is a schematic diagram of an optoelectronic device embodying this invention.
Figure 2 is a schematic circuit diagram of a shift register embodying this invention.
Figure 3 is an idealized graph of the time relationship of operations occurring at certain portions of the circuit

In Figure 1, a radiation (e.g., light) generating element 10 is connected in an electrical series combination with a radiation-sensitive element 12. The radiation-generating element is shown as an electroluminescent (*el*) cell 10. The radiation-sensitive element is shown as a photoconductive (*pc*) cell 12. A source of electrical potential 14 (which may be alternating or direct, depending on the type of *el* cells that are used) is connected across the series combination 15 of the *el* and *pc* cells 10 and 12. A second series combination 17 includes a second *el* cell 16 and a second *pc* cell 18 connected electrically in series. This second series combination 17 is connected in shunt across the first *el* cell 10. By an appropriate photoduct (or light channel) 20, radiation generated by the first *el* cell 10 is led or guided to the first *pc* cell 12. This first *pc* cell 12 also receives input radiation by way of a photoduct 22. The second *pc* cell 18 receives additional input or "control" radiation via a photoduct 24. The second *el* cell 16 supplies output radiation via a photoduct 26. The associated *el* and *pc* cells are suitably matched with respect to their respective spectral characteristics for emission and sensitivity.

An explanation of the operation of elements 10, 12, and 14 as a "radiation amplifier," and as a bistable device having a hysteresis characteristic, is described in the above-cited article by Loebner.

In operation, the first *pc* cell 12 presents a high impedance to current from the electrical source 14 in the absence of input radiation in the photoduct 22, and a low impedance when it receives radiation of a certain wave length and intensity to which it is responsive. Thus, in the absence of radiation in the photoduct 22, the first *pc* cell 12 is in the high impedance condition, and a relatively small part of the voltage of the source 14 is applied across the first *el* cell 10. As a result, the voltage across the first *el* cell 10 is insufficient for this cell 12 to generate radiation of substantial intensity.

When the first *pc* cell 12 receives a substantial input radiation via the input photoduct 22, this cell 12 starts to change to a low-impedance condition, and a larger part of the potential from the source 14 is applied across the first *el* cell 10. The current in the *el* cell 10 increases, and this cell then generates a substantial radiation, which is led back by the photoduct 20 to the first *pc* cell 12. The radiation led back by way of the photoduct 20 to the first *pc* cell 12 is regenerative and tends to drive that cell 12 further toward the low-impedance condition. Due to gain in the *pc* cell 12 (a large change in impedance with small change in radiation input), this regenerative action continues until the feedback radiation in photoduct 20 is at a level such as to maintain the first *el* cell 10 in a radiation-generating (or "on") condition. The feedback radiation in the photoduct 20 is sufficient to maintain the series combination 15 in that stable on-condition after the input radiation in photoduct 22 ceases.

The operation described thus far takes place during the absence of radiation in the photoduct 24, which circumstance results in the shunt *pc* cell 18 being in the high-impedance condition. The circuit of Figure 1 remains in this stable condition until control radiation is supplied to the photoduct 24 and received by the second *pc* cell 18. When this control radiation is received by the *pc* cell 18, this cell 18 is changed to the low-impedance condition. Generally, the impedance relationships of the *pc* and *el* cells are as follows: When radiation is not applied to a *pc* cell in this circuit, the *pc* cell is in the high-impedance condition and has an impedance that may be at least as much as several orders of magnitude greater than the *el* cells; when such a *pc* cell is in the low-impedance condition due to applied radiation, the impedance of the *el* cells may be several orders of magnitude greater than that of that *pc* cell.

Accordingly, when the *pc* cell 18 is in the low-impedance condition, a substantial part of the voltage from the source 14 is then applied across the second *el* cell 16 by way of the series path of the first *pc* cell 12, the second *el* cell 16, and the second *pc* cell 18. As current flows in the shunt combination 17, the second *el* cell 16 starts to generate radiation, supplying it to the output photoduct 26.

As the second *pc* cell 18 changes to the low-impedance condition, the effective shunt impedance of the second *el* and *pc* cells 16 and 18 reduces the voltage across the first *el* cell 10, and, thereby, reduce the energizing current in that cell 10. A reduction in the energizing current in the *el* cell 10 may result in a substantial decrease in the feedback radiation from the *el* cell 10 because the radiation generated is in accordance with approximately the third power of the current. This decrease in feedback radiation, in turn, results in an increase of the impedance of the first *pc* cell 12, and, therefore, a further decrease in energizing current for the *el* cell 10. Thus, a regenerative feedback action in the "off" direction takes place in the series combination 15 with the increased impedance of the first *pc* cell 12, which action results in a further reduction in light from the *el* cell 10. This feedback action continues until the first *el* cell 10 is extinguished. At that time, the high impedance of the first *pc* cell 12 likewise extinguishes the second *el* cell 16. Thus, the application of radiation to the *pc* cell 18 places the circuit of Figure 1 in the off-condition.

This off-condition continues until input radiation in the photoduct 22 triggers the first *pc* cell 12 to the low-impedance condition, which drives the first *el* cell 10 to a radiation-generating condition. The operation described above is then repeated. In general, decrease and increase, respectively, in the impedance of the *pc* cell 12 tend to produce increase and decrease, respectively, in radiation from the *el* cells 10 and 16; however, decrease and increase, respectively in the impedance of the *pc* cell 18 tend to produce increase and decrease, respectively, in radiation from the *el* cells 16, and to produce decrease and increase, respectively, in the radiation from the *el* cell 10.

The circuit of Figure 1 may be used to store binary signals, which signals may be in the form of a pulse of radiation (in the spectral range of sensitivity of, say, the *pc* cell 12) and the absence of such a pulse respectively representing the binary digits "1" and "0." These digits "1" and "0" (as well as an input pulse and the absence of a pulse) may also be represented by the on- and off-conditions, respectively, of the circuit and by the presence and absence, respectively, of radiation in an output photoduct 26 (discussed below in connection with Fig. 2). A control pulse of radiation in the photoduct 24 reads out the stored binary signals by driving the circuit to the off-condition. This action produces binary output signals in the photoduct 26 in the form of a pulse or the absence of a pulse accordingly as the circuit was in the on- or off-condition, respectively.

In Figure 2, a plurality of binary storage elements of the type shown in Figure 1 are connected in a circuit known as a shift or stepping register. This shift register includes four stages 30, 32, 34, 36 of similar (except for differences noted below) construction. As many additional stages as desired may be used. Parts of the first and third stages 30 and 34 are referenced by the same numerals as the corresponding parts of Figure 1; different reference numerals are used for the second and fourth stages 32 and 36 to simplify the discussion and presentation. The similarities of all four stages 30, 32, 34, 36 should be apparent at a glance.

One terminal of the power supply 14 is connected to each of the stages, and the other power supply terminal is connected to a common connection shown as the conventional ground symbol. The output photoduct 26 from the first stage 30 is arranged to transmit light to the first *pc* cell 40 of the second stage 32. This *pc* cell 40 is connected in a first electrical series combination with a first *el* cell 42. Radiation from the *el* cell 42 is fed back to the first *pc* cell 40 by way of the photoduct 44. A second *el* cell 46 and a second *pc* cell 48 are connected electrically in a series combination and this second series combination is connected in electrical shunt across the first *el* cell 42. The *pc* cell 48 receives radiation by way of the photoduct 50.

Radiation from the *el* cell 46 is transmitted to the *pc* cell 12 of the third stage 44 by way of the photoduct 52. Radiation generated by the second *el* cell 16 of the third stage 34 is transmitted by way of the photoduct 26 to the *pc* cell 40 of the fourth stage 36.

Radiation generated from the *el* cell 46 of the fourth stage 36 is transmitted by way of the photoduct 52 to a succeeding stage (not shown). If it is desired to connect the circuit as a ring counter, the light channel or photoduct 52 of the last stage 36 may be appropriately connected to, or form a part of, the light channel 22 of the first stage 30 to feed back radiation impulses from the *el* cell 46 of the last stage 36 to the *pc* cell 12 of the first stage 30.

Reference is made to the idealized waveform graph of of Figure 3 to indicate the time relationships of passages of radiation through certain photoducts in the circuit of Figure 2.

In operation, radiation shift pulses are supplied alternately to the photoducts 24 and 50 from sources 25 and 51, respectively, which may be, for example, *el* cells that are periodically and alternately energized in any appropriate manner. When the *pc* cell 12 of the first stage 30 receives an input pulse of radiation via the photoduct 22, the first *el* cell 10 is changed to a radiating condition. Radiation feedback (referenced by numeral 82 in Figure 3) by way of the photoduct 20 to the *pc* cell 12 holds this stage 30 in the on-condition after the radiation impulse on the channel 22 terminates. This 1-state or on-condition of the first stage 30 is read out by a first shift radiation impulse 84 (Figure 3) applied to the *pc* cell 18 via the photoduct 24. This read-out operation restores the stage 30 to the 0-state by changing the *el* cell 10 to the non-radiating stage. At the same time, and momentarily, the *el* cell 16 is turned on to the radiating state. The *el* cell 16 radiation pulse 86 (Figure 3) in the photoduct 26 is generated during the time that the *pc* cell 12 is being returned to the high impedance state. The output radiation pulse 86 in the photoduct 26 of the first stage 30 is transmitted to the *pc* cell 20 of the second stage 32 to change that stage 32 to the 1-state, or on-condition, which on-condition is indicated by a passage 88 (Figure 3) of radiation in the photoduct 44.

A second shift pulse 90 (Figure 3) in the photoduct 50 restores the second stage 32 to the 0-state, terminating the radiation passage 88 in the photoduct 44. This operation by the second shift pulse 90 is accompanied by a pulse 92 of radiation in the photoduct 52. This pulse 92 transfers the 1-state to the third stage 36 by driving that stage 36 to the on-condition.

In a similar manner, the 1-state is transferred from the third stage 34 to the fourth stage 36 when a first shift pulse 84 is supplied to the photoduct 24 of the stage 34. The 1-state is transferred out of the last stage 36 by way of the photoduct 52 when a second shift pulse 90 is applied to the photoduct 50 of that stage 36. Alternate stages (e.g., stages 30, 34, etc.) may be used to store digital signals at any instant; the other stages 32, 36, etc., may serve as transfer signals.

When the first stage 30 is in the 0-state, and a first shift pulse 84 is applied to the *pc* cell 18 of that stage 30 via the photoduct 24, the *el* cell 16 remains in the non-generating condition due to the *pc* cell 12 being in the high impedance state. Consequently, no radiation impulse is generated by the *el* cell 16; this operation is, in effect, the transfer of the 0-state from stage 30 to stage 32. The transfer of the 0-state from the other stages is performed in a similar way.

Digital radiation signals may be supplied simultaneously to the *pc* cells 12 and 40 of all the stages 30, 32, 34, and 36 by way of input photoducts 54, 56, 58, and 60. Such application of digital radiation signals to the *pc* cells 12 and 40 affects the stages receiving the radiation, but does not affect the neighboring stages. Neighboring stages are unaffected, because the stages are uncoupled from each other except during the passage of radiation from the second *el* cells 16 and 46 to the succeeding stage *pc* cells 40 and 12, respectively. This latter passage of radiation is unidirectional, and occurs only when shift pulses are applied to the shunt *pc* cells 18 and 50, respectively.

Binary signals stored in the stages 30, 32, 34, 36 may be continuously displayed by means of photoducts 62, 64, 66, 68, respectively, from the corresponding *el* cells. These binary signals (the presence and absence of radiation, respectively) may be read-out at any desired time without affecting their storage in the shift-register stages. Read-out may be performed by any photosensitive device, for example, by a photographic record plate. Such a photographic record may be stored indefinitely, and used, when desired, to reinsert the information in the shift register by directing radiation through the photographic plate to the corresponding photoducts 54, 56, 58, 60.

Figure 4:
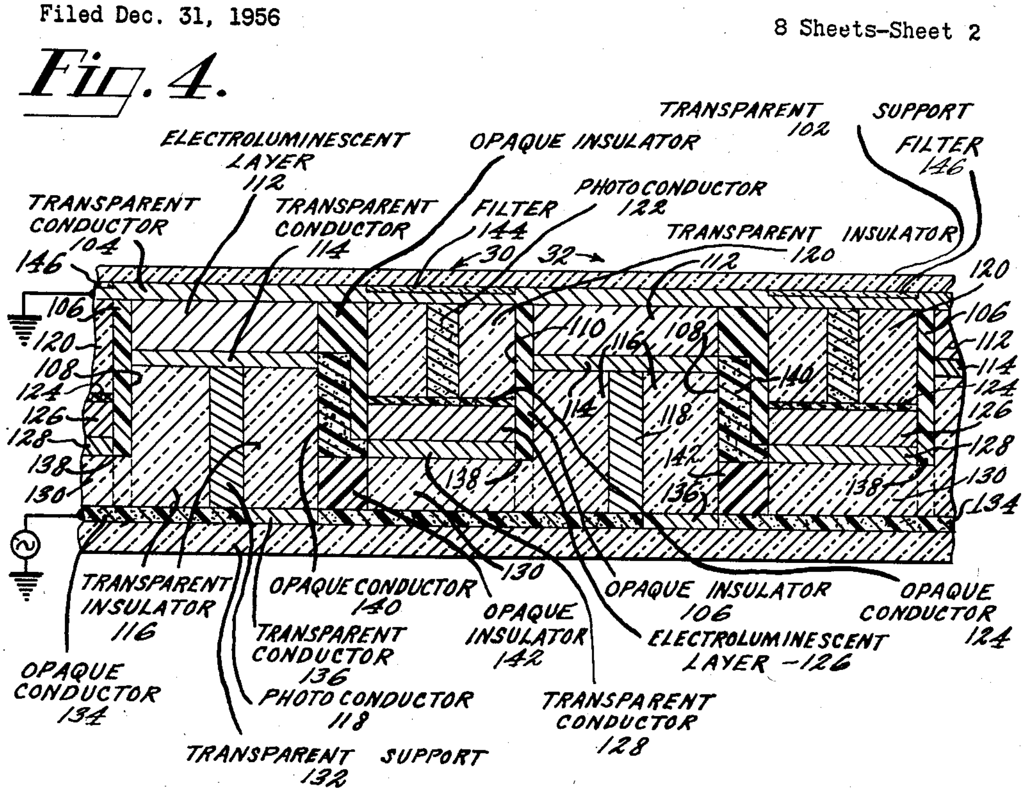
Figure 4 is a fragmentary sectional view of an electroluminescent photoconductive panel construction that may be used for the shift register circuit of Figure 2.

In Figure 4, there is shown a fragmentary sectional view of an electroluminescent photoconductive panel that may be used for the shift register circuit of Figure 2. Two stages 30 and 32 are shown in Figure 4; other corresponding stages (not shown) would be identical. References are made to the parts of Figure 2 to relate the corresponding parts of that schematic diagram to those shown in the structural Figure 4. This *el-pc* shift register includes a first sheet 102 of transparent material such as glass, or any other suitable transparent dielectric material to which a transparent conductive coating can be applied. Unon one surface of the sheet 102, a transparent conductive coating 104 is deposited. Suitable such coatings are well known in the art. Thus, for instance, if a hot glass (or other transparent) surface is exposed to tin chloride ($SuCl_4$) or to a sprayed mist of solvent containing sad $SuCl_4$, a reaction takes place resulting in a very thin conducting coating, presumably an oxide of tin. It is well known in the art that additions of other ingredient metals like indium and antimony can further lower the resistance of the coatings. It is possible to achieve coatings having resistances as low as 10 ohms per square and transmission as high as 85% to 95%. Also, evaporated thin films of gold, silver, aluminum have been found to be suitable. Adjacent to the transparent conductive coating 104 is a frame structure 106 that is made of opaque insulating material of a suitable synthetic resin or plastic. This resin can be either a suitable plastic like araldite or ethyl cellulose containing non-conducting carbon black powder particles, such as is employed in making rubber. It is also possible to employ a photosensitive glass, called "Fotoform" glass, which can be suitably darkened by exposing the portions to be darkened to ultraviolet radiation and heating the glass to an elevated temperature. The same glass will also etch preferentially after exposure to ultraviolet and thus can provide the openings 108 and 110.

This frame 106 may be a cast structure in which two sets of cylindrical openings 108 and 110 are formed therethrough. The larger cylindrical opening 108 of each stage 30 or 32 is used to form the first series combination 15 or 45 of each stage 30 or 32, respectively, and the second smaller opening 110 is used for the second *el-pc* series combination 17 or 47 of each stage 30 or 32, respectively. Deposited within the larger opening 108 (starting from the top as viewed in Figure 4) is a layer of electroluminescent material 112 (corresponding to *el* cells 10 or 42) such as compounds in the sulphide phosphor family, for example, zinc sulfo-selenide activated with copper and a halide coactivator, or any other material known to electroluminese with sufficient efficiency. The electroluminescent materials are suitably embedded in a plastic like "Kel-F," araldite, ethyl cellulose, glass, ceramic. In the latter case, a conductive coating of the kind of 104 can be directly formed on the *el* layer. This layer 112 is in electrical contact with the conductive coating 104. A second transparent conductive coating 114 of the same type as the coating 104 is deposited on the other side of the electroluminescent layer 112 or on 116. A transparent insulating material 116, such as clear glass or any other suitable clear dielectric fills the remainder of the space of the openng 108, except for a cylndrical opening that is filled with photoconductive material to form a photoconductive element 118 (corresponding to the *pc* cell 12 or 40). The photoconductive material may be crystals of radiation responsive materials like suitably prepared cadmium sulfide. These could be in the form of large crystals or powder particle dimensions bound together by a suitable matrix into a layer or stratum, or they may be sintered together.

A portion of the opening 110 adjacent the conductive layer 104 is filled with a transparent-insulating material 120 except for a cylindrical opening 122 that is filled with photoconductive material to form a photoconductive element (corresponding to the *pc* cell 18 or 48). This *pc* element 122 is in electrical contact with the transparent conductive layer 104. A layer 124 of opaque conducting material is placed across the other side of the transparent-insulating layer 120. This layer 124 may be a layer of reflecting metallic material like silver, aluminum, gold or any of the available conducting inks or a suitable suspension of conducting particles in an organic binder, which later volatalizes. An electroluminescent layer 126 (corresponding to the *el* cell 16 or 46) is deposited within the opening 110 between the opaque conductor 124 and a transparent conductor 128. Transparent insulating material 130 fills the remainder of the opening 110.

A second sheet of transparent material 132, such as glass, is provided with a conductive coating 134 that is generally opaque, but has transparent portions 136 (corresponding to photoduct 54 or 56) at part of the opening 108. The conductive layer 134, 136 is in electrical contact with the *pc* elements 118. This layer 134, 136 is generally bonded or in contact to the transparent insulator photoducts 130 and parts of the opaque frame 106 to complete a sandwich with the other conductive layer 104.

A portion 138 of the opaque frame wall 106 between the opening 110 in one stage 30 and the opening 108 in the succeeding stage 32 is left open and filled with transparent material to provide a photoduct (corresponding to photoduct 26) from the *el* element 126 (corresponding to the *el* cell 16) and the photoconductor 118 (corresponding to the *pc* cell 40). Portions of the wall of the frame 106 between openings 108 and 110 in the same stage 30 or 32 are omitted to permit the deposit of an opaque conductor 140, such as conducting inks, electrically connecting the transparent conductor 114 in the opening 108 only to the transparent conductor 128 in the opening 110. Thereby, the *el* element 112 (*el* cell 10) is electrically connected to the *el* element 126 (*el* cell 16). An opaque insulator 142 separates the photoduct 116 in the opening 108 from the photoduct 130 in the opening 110. Photoducts leading to the same *pc* cell may be isolated optically from each other by terminating these photoducts at different sides of the *pc* cell. Similarly, photoducts leading from the same *el* cell may be isolated by starting these photoducts at different parts of the *el* cell.

Portions 144 and 146 of the transparent layer 102 over the opening 110 are optical filters that may be provided in those portions of the transparent layer 102. By means of such filters 144 and 146 different non-overlapping spectral ranges of radiation may be applied to the *pc* units 122 of the stages 30 and 32, respectively. With this filter arrangement, the radiation ranges from the sources 25 and 51 (Figure 2) likewise are different and respectively correspond to the spectral characteristics of the filters 144 and 146. The sources 25 and 51 are, thereby, effectively isolated optically from the other photoducts 50 and 24, respectively. The photoconductors 122 (*pc* cells 18 and 48) may be the same and of a spectral-response range including at least part of the ranges of the filters 144 and 146. In place of the filters 144 and 146, the photoconductors 122 of the stages 30 and 34 may be the same and different from those 122 of the stages 32 and 36 (the latter also being the same). The spectral-response ranges of these photoconductors 122 of the stages 30 and 32 may be made to be different (instead of using the filters 144 and 146) corresponding respectively to the emission ranges of the sources 25 and 51.

This optical isolation of the photoducts 24 and 50 from each other may also be performed by an appropriate geometry of construction of the panel; such as, by having one set of photoducts receive light from one side of the panel and not from the other and vice versa for the other set of photoducts.

Some suitable parameters for the *pc* and *el* cells of Figure 4 are the following: (*a*) the dark admittance of the *pc* cells may be smaller than 0.2 millimho-cm.$^2$; (*b*) the photo-response may be of the order of 0.1–1.0 mho-cm.$^2$ per lumen; (*c*) electroluminous emittance may be about 0.01 lumen per cm.$^2$ at about 400 c.p.s. and electric fields of about 50,000 volts per cm.

Figure 5:
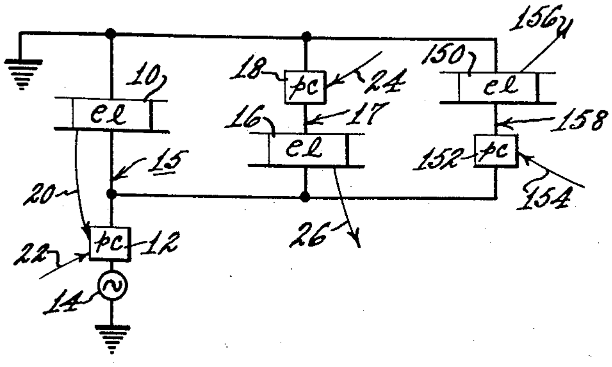
Figure 5 is a schematic circuit diagram of a "branching" circuit embodying this invention.

In Figure 5, a schematic circuit diagram of a modification of the unit of Figure 1 is shown; parts corresponding to those previously described are referenced by the same reference numerals. In addition to the shunt series combination 17 of *el* cell 16 and *pc* cell 18, a second shunt series combination 158 is provided by an *el* cell 150 and a *pc* cell 152. This second shunt series combination 158 is also connected electrically across the *el* cell 10. The *pc* cell 152 receives radiations via the photoduct 154, and the *el* cell 150 generates radiation into the photoduct 156.

In operation, the second shunt combination 150, 152 provides a read-out means that is alternative to the other shunt combination 17. The other shunt combination 17 supplies output radiation to the photoduct 26 in response to a read-out radiation pulse in the photoduct 24 in the manner described above. If control radiation is received instead in the photoduct 154, the *pc* cell 152 is driven to the low impedance condition in a manner similar to the *pc* cell 18. The *el-pc* combination 15 (assuming it was in the on-condition) is triggered to the off-condition, and a pulse of output radiation is supplied to the photoduct 156 by the *el* cell 150. Thus, by selectively directing appropriate radiation to the photoduct 24 or the photoduct 154, binary signals stored in the *el-pc* combination 15 are read out of the photoduct 26 or the photoduct 156, respectively.

The selective "branching" read-out operation that may be performed with the circuit of Figure 5 permits the selective switching of radiation signals into different circuits. Additional *el-pc* combinations (not shown) may be connected electrically in shunt to the *el* cell 10 (the number of such shunt combinations may be limited by the resulting impedance of these *pc-el* combinations when connected in parallel). Each output photoduct 26 and 156 in the shunt *el-pc* combinations may be coupled in turn to other storage elements (not shown), which have, in turn, a plurality of shunt *el-pc* read-out combinations. Such selectively-operable "branching" circuits may be further cascaded to carry out any desired pattern of signal switching.

Figure 6:
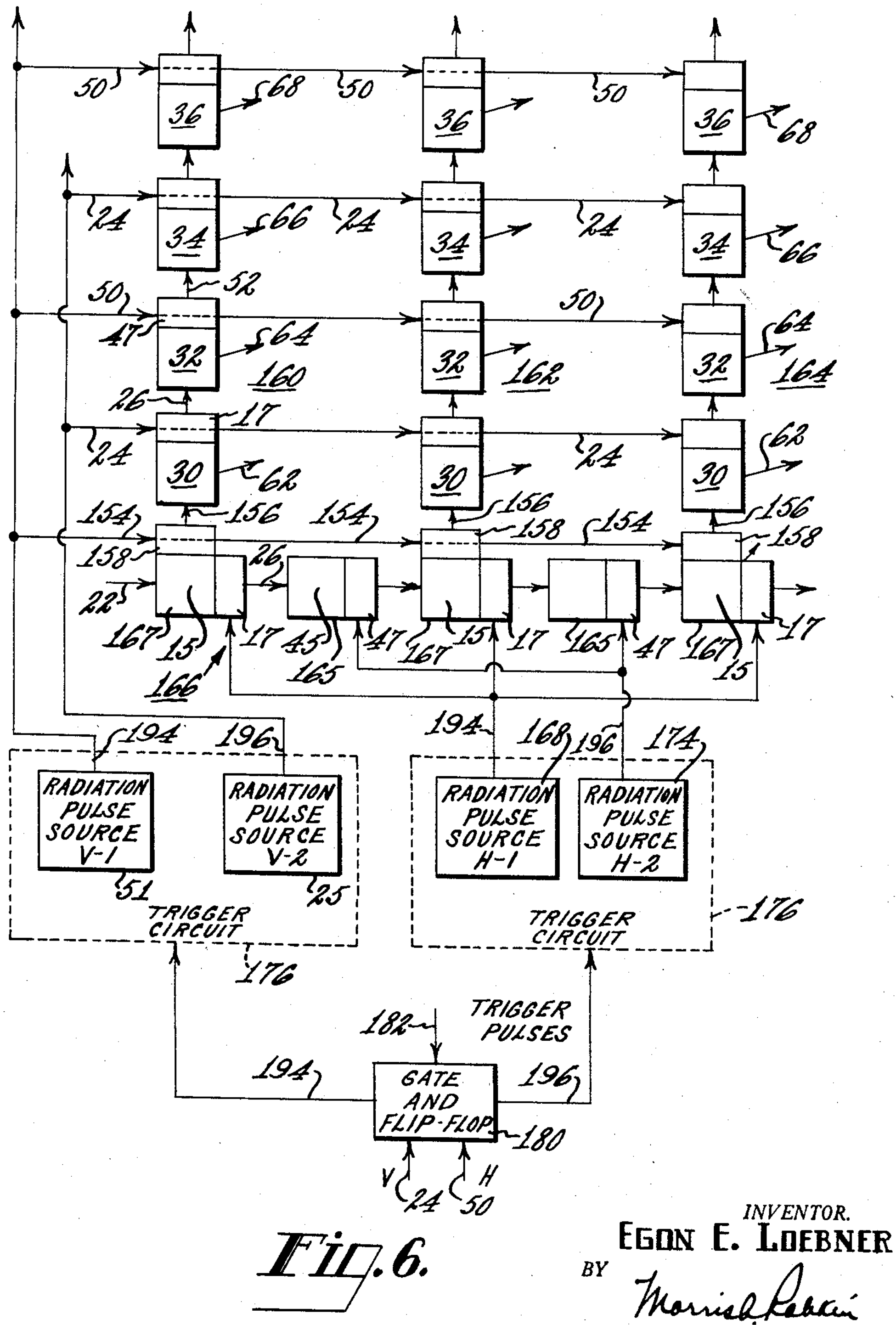
Figure 6 is a schematic circuit diagram of a shift register system for displaying binary signals embodying this invention.

In Figure 6, a binary shift register display system is shown. This system includes a plurality of shift registers 160, 162, and 164, only three of which are shown for simplicity of illustration. These shift registers 160, 162, 164 are shown arranged vertically in the drawing, and each is of the type shown in Figure 2 including four stages 30, 32, 34, and 36. Parts corresponding to those previously described are referenced by the same numerals.

The system of Figure 6 also includes a horizontal (as shown in the drawing) shift register, in which the even-position stages 165 are of the type referenced by numeral 32 in Figure 2, and the odd-position stages 167 are of the "branching" type shown in Figure 6. That is, the odd-position stages 167 of the horizontal register 166 each includes a second shunt *pc-el* combination 158. The output photoducts 156 of each odd-position stage 167 in the horizontal register 166 is connected to the input photoduct of the stage 30 of a different one of the vertical shift registers 160, 162, and 164, respectively. With this arrangement, each odd-position stage 167 of the horizontal shift register 166 also operates as the first or input stage of a different one of the vertical shift registers 160, 162, and 164.

The shunt combinations 17 of the odd-position stages 167 of the horizontal register 166 receive first shift pulses from the pulse source 168; the shunts 47 of the even-position stages 165 receive second shift pulses from the pulse source 174. The first vertical shift pulses from the pulse source 51 are also applied to the control photoducts 154 of the shunt combinations 158 of the odd-position stages 167 in the horizontal register 166.

The radiation pulse sources 25 and 51 may be the *el* cells 46 and 16 of a trigger circuit 176 of the type shown in Figure 7 and described below. The output photoducts 194 and 196 alternately supply radiation pulses to the control photoducts of the shift register stages. Similarly, the pulse sources 168 and 174 may be corresponding *el* cells of a trigger circuit 178 of the same type.

Figure 7:
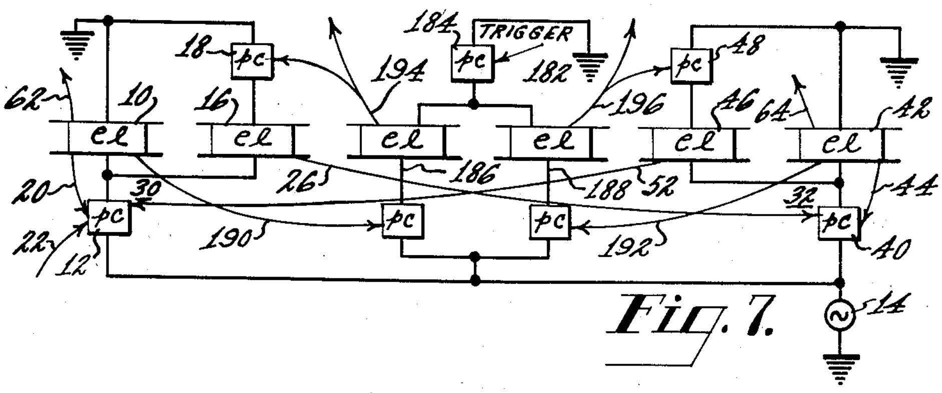
Figure 7 is a schematic circuit diagram of a trigger circuit embodying this invention.

In Figure 7, a bistable trigger circuit includes two cross-coupled stages 30 and 32 of a shift register. Parts corresponding to those previously described are referenced by the same numerals. The two stages 30 and 32 of the trigger circuit in Figure 3 are similar to the stages 30 and 32 of the register shown in Figure 2. The output photoduct 52 from the *el* cell 46 is connected to apply radiation to the *pc* cell 12 of the stage 30, and the output photoduct 26 of the *el* cell 16 is connected to the *pc* cell 40 of the stage 32.

In addition, a gate circuit includes a common *pc* cell 184 connected in series with two parallel *el-pc* series combinations 186 and 188. Radiations from the *el* cells 10 and 42 are respectively applied to the *pc* cells of the combinations 186, 188 via the photoducts 190 and 192, respectively. Output photoducts 194 and 196 supply pulses from the combinations 186 and 188, respectively, to the *pc* cells 18 and 48.

The stage 30 may be set to the "on" condition by means of radiation applied via the photoduct 22 to the *pc* cell 12. With the stage 30 in the "on" condition, the *pc* cell of the combination 186 receives "priming" radiations from the *el* cell 10 via the photoduct 190. When a first trigger pulse of radiation is applied to the *pc* cell 184 via the photoduct 182, that *pc* cell 184 is changed to the low conductive state, and the *el* cell of the combination 186 momentarily generates radiation. Due to the absence of radiation in the photoduct 192, the shunt combination 188 remains in the non-generating state during this first trigger pulse.

The pulse generated by the *el* cell of the combination 186 is applied to the *pc* cell 18 to drive the stage 30 to the off-condition. Consequently, a radiation pulse is applied to the *pc* cell 40 via the photoduct 26 to turn the stage 32 to the on-condition. When the stage 32 is in the on-condition, the *pc* cell of the combination 188 is biased to the low-impedance condition by radiation in the photoduct 192. Consequently, when the next trigger pulse is received by the *pc* cell 184 via the photoduct 182, the *el* cell of the combination 188 is energized momentarily and radiation is supplied to the *pc* cell 48 via the photoduct 196. The stage 32 is driven to the off-condition, and the stage 30 is returned to the on-condition. Thus, each successive two trigger pulses in the photoduct 182 reverse the relative initial conditions of the two stages 30 and 32 and then return them to their initial condition.

The application of trigger pulses to the trigger circuit 176 or the trigger circuit 178 depending upon whether vertical shift or horizontal shift is desired, may be controlled by means of a gate and flip-flop 180, which receives trigger pulses via a photoduct 182 and set and reset pulses via photoducts 24 and 50.

Figure 8:
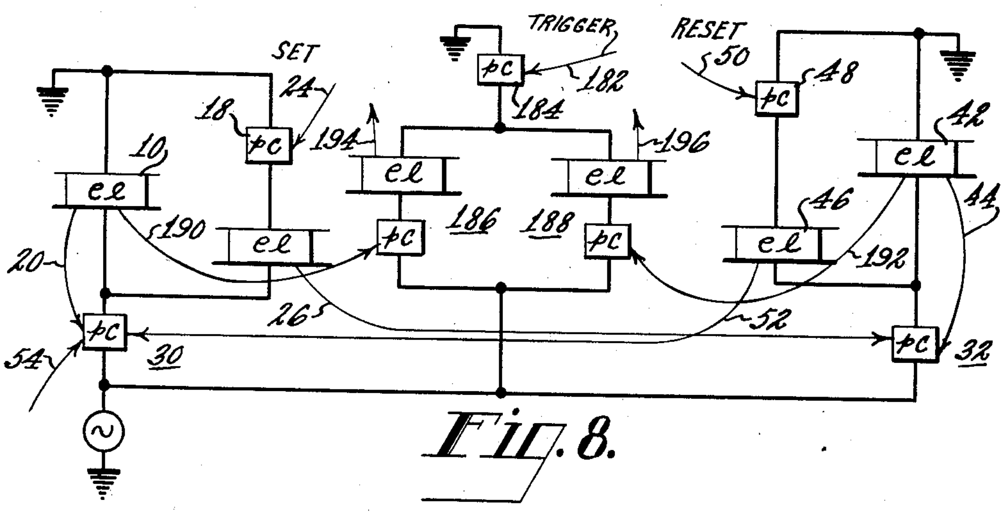
Figure 8 is a schematic circuit diagram of a flip-flop and gate circuit embodying this invention that may be used in the system of Figure 6.

A suitable gate and flip-flop circuit that may be used is shown in Figure 8; parts corresponding to those previously described are referenced by the same reference numerals. The circuit of Figure 8 is similar to the trigger circuit of Figure 7 except that the photoducts 194 and 196 are not connected to the *pc* cells 18 and 48. These latter cells 18 and 48 receive radiations only via the set and reset photoducts 24 and 50, respectively.

The operation of the shift register display system of Figure 6 is described with the assumption that initially all of the storage elements of the registers are in the off-condition. The flip-flop 180 is reset to direct trigger pulses to trigger circuit 178 and, thereby, to generate successive pairs of horizontal shift pulses. Synchronously with the application of the second horizontal shift pulses to the even-position stages 165, a binary "video" signal may be applied to the input photoduct 22 of the horizontal register. 166 The next first horizontal shift pulse shifts this binary signal to the second stage of the horizontal register 166. Successive binary signals are entered into the horizontal register 166 in the same way and shifted two stages in that register 166 with each succeeding pair of horizontal shift pulses.

When a desired combination of input signals has been entered into the horizontal register 166 and stored in the odd-position register stages 167, the flip-flop 180 is set to direct two trigger pulses to the trigger circuit 176. The first vertical shift pulse is applied to the photoducts 154 of the horizontal register combinations 158. This vertical shift pulse actuates a transfer of the signals in the odd-position stages 167 of that register 166 to the stages 30 of the vertical registers. The second vertical shift pulse applied to the photoducts 24 completes the transfer of the signals to the register positions 32 of the vertical registers 160, 162, 164.

The flip-flop 180 is then returned to the reset condition to direct trigger pulses again to the trigger circuit 178. The horizontal register 166 receives the next combination of binary "video" signals under the control of a train of horizontal shift pulses. After the second combination of "video" signals has been entered into the horizontal register 166, a pair of vertical shift pulses are then applied to the "branching" combinations 158 and to the vertical registers 160, 162, and 164. These vertical shift pulses cause the signals stored in the stages 32 of the vertical registers 160, 162, and 164 to be transferred to the stages 36 of these same registers, and cause the signals stored in the odd-position stages of the horizontal register 166 to be transferred to the stages 32 of the vertical registers 160, 162, and 164, in the manner described above. Successive binary signal combinations may be entered into the horizontal register and transferred into the vertical registers in this manner within the limit of the vertical register capacity. When the desired binary input signal combinations are stored in the vertical registers 160, 162, 164, a radiation display of these stored signals is provided by way of the output photoducts 62, 64, 66, and 68 for each of the vertical shift registers 160, 162, 164.

The vertical shift operation need not be as fast as the horizontal shift operation, because a greater amount of time is provided for the vertical operation. Once the information has been transferred out of the horizontal shift register 166 to the stages 30 of the vertical registers 160, 162, 164, a new combination of binary signals may be entered into the horizontal shift register 166 at the same time that the transfer in the vertical shift registers is being carried on. This simultaneous operation of the horizontal register 166 with operation of the vertical registers may take place, because the horizontal register 166 is uncoupled from the vertical registers, except where vertical shift pulses are applied to the control photoducts 154. Appropriate modifications of the gate flip-flop 180 for providing simultaneous transfer in the horizontal register 166 with a second shift pulse transfer in the vertical registers 160, 162, 164 will be readily apparent to one skilled in the art from the above descriptions.

Figure 9:
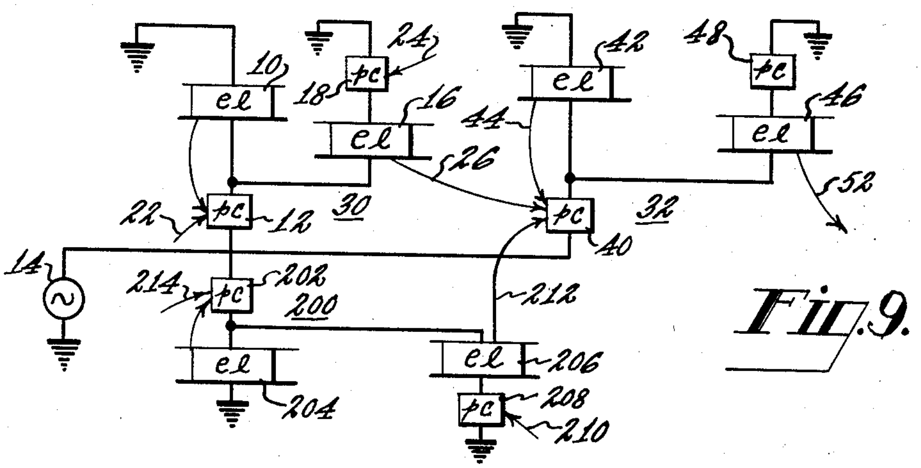
Figure 9 is a schematic circuit diagram of a system embodying this invetnion for carrying out the logic operation of "or"

In Figure 9, a circuit is shown for carrying out the logic operation of "or." Two stages of the shift register described above with respect to Figure 2 are shown in Figure 9; parts corresponding to those previously described are referenced by the same numerals. Also shown in Figure 9 is a third binary element 200 that includes a first series combination of a *pc* cell 202 and an *el* cell 204 arranged to provide radiation feedback from the *el* cell 204 to the *pc* cell 202. Connected in shunt across the *el* cell 204 is the series combination of an *el* cell 206 and a *pc* cell 208. The *pc* cell 208 receives radiation pulses on the photoduct 210. These latter radiation pulses are the first shift pulses 84 (Figure 3), which are those simultaneously applied to the photoduct 24 of the stage 30. A photoduct 212 leads radiation from the *el* cell 206 to the *pc* cell 40 of the stage 32.

In operation, the stage 200 is similar to that of the stage 30 as described above with respect to Figure 2. If an input radiation pulse is directed to the *pc* cell 202 by way of the input photoduct 214, the binary element 200 is set to the on-condition. The next first shift pulse received by way of the photoduct 210 resets the binary element 200 to the off-condition and completes the transfer of the on-condition in the form of a radiation pulse by way of the photoduct 212 to the *pc* cell 40 of the stage 32. This operation of the stage 200 is generally similar to the individual operation of the stage 30. If either input photoduct 22 or 214 receives a radiation pulse, this pulse is transferred to the stage 32, in the manner described above, under the control of the next first shift pulse. If both input photoducts 22 and 214 receive input pulses, pulses are transferred from both stages 30 and 200 via the photoducts 26 and 212, respectively, to the *pc* cell 40. The radiation pulses in the output photoducts 26 and 212 are consistent and tend to produce the same result in the *pc* cell 40, namely, to drive the stage 32 to the on-condition. Thus, the circuit of Figure 9 operates to perform the logic operation of inclusive "or."

Figure 10:
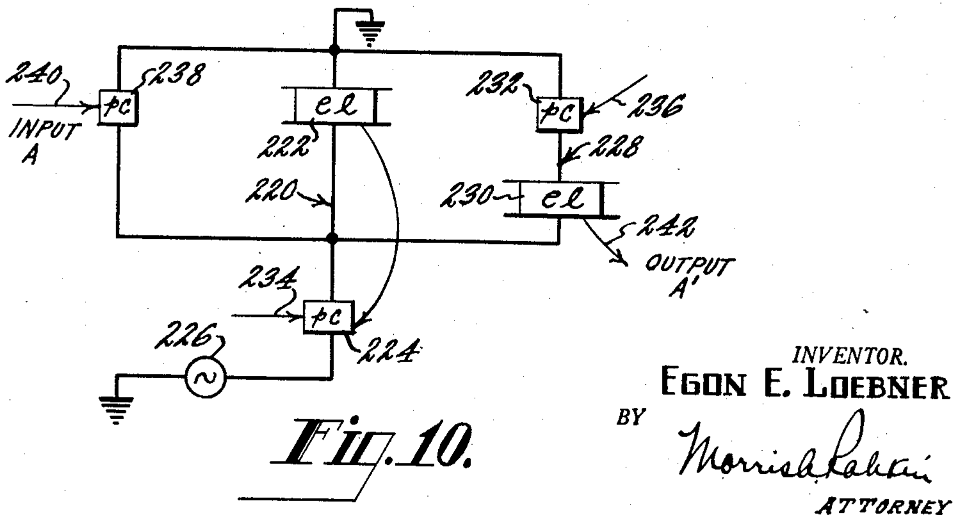
Figure 10 is a schematic circuit diagram of a system embodying this invention for performing the logic operation of "negation"

In Figure 10, a schematic circuit diagram is shown of a circuit for carrying out the logic operation of "negation." A first series combination 220 includes an *el* cell 222 and a *pc* cell 224 connected electrically in series with a power source 226. A feedback connection from the *el* cell 222 to the *pc* cell 224 causes the combination to operate as a binary element, in the manner described above. A second series combination 228 is made up of an *el* cell 230 in series with a *pc* cell 232, and this combination 228 is connected in shunt with the *el* cell 222. The *pc* cells 224 and 232 periodically receive respective radiation pulses 242 and 244 (shown in Figure 11) via the photoducts 234 and 236, respectively. A second shunt across the *el* cell 222 includes a *pc* cell 238 that receives input radiation signals A by way of the photoduct 240. Output signals A' are produced at the output photoduct 242 of the *el* cell 230.

Figure 11:
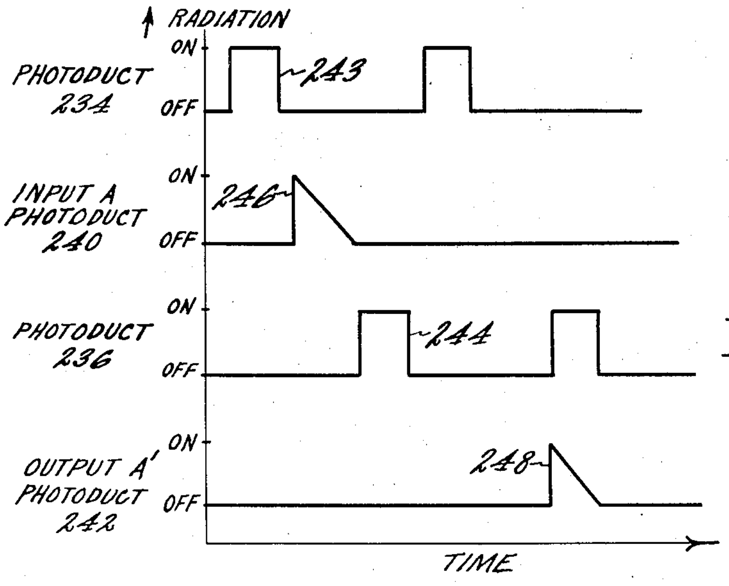
Figure 11 is an idealized graph of the time relationship of operations occurring at certain portions of the circuit of Figure 10.

In operation, radiation pulses 243 are periodically applied to the photoduct 234 to set the binary element 220 to the on-condition. Likewise, radiation pulses 244 are periodically applied to the photoduct 236 at time intervals spaced from and alternate with the intervals of the pulses 243 to drive the binary element 220 back to the off-condition. Input signals A, such as the pulses 246, are applied to the photoduct 240 in the time interval between the pulses 243 and the pulses 244, as shown in Figure 11. Consider the situation of the binary element 220 having been driven from the off-condition to the on-condition by a first pulse 243 applied to the *pc* cell 224. An input pulse 246 that is then applied to the shunt *pc* cell 238 restores the binary element 220 to the off-condition. The next pulse 244 that is applied to the photoduct 236 of the shunt combination 228 finds the binary element 220 already in the off-condition and the *pc* cell 224 in the high-impedance state. Therefore, this pulse 224 has no effect on the *el* cell 230, and no radiation pulse is produced at the output photoduct 242 (as shown in Figure 11).

The next pulse 243 on the photoduct 234 again drives the binary element 220 to the on-condition. If the next input signal A is the absence of a radiation pulse in the photoduct 240, there is no change in the binary element's condition until the next pulse 244 is received in the photoduct 236. When this pulse 244 is received, the binary element 220 is driven to the off-condition, and the *el* cell 230 in the shunt combination 228 is momentarily driven to the generating condition. Thus, a radiation pulse 248 is generated in the photoduct 242 (as shown in Figure 11). Accordingly, the output signals A' in the photoduct 242 are the logical inverse of the input signals A. That is, the circuit of Figure 10 performs a logic operation of negation: An input pulse results in an output in the form of the absence of a pulse; and an input in the form of the absence of a pulse results in an output pulse.

Figure 12:
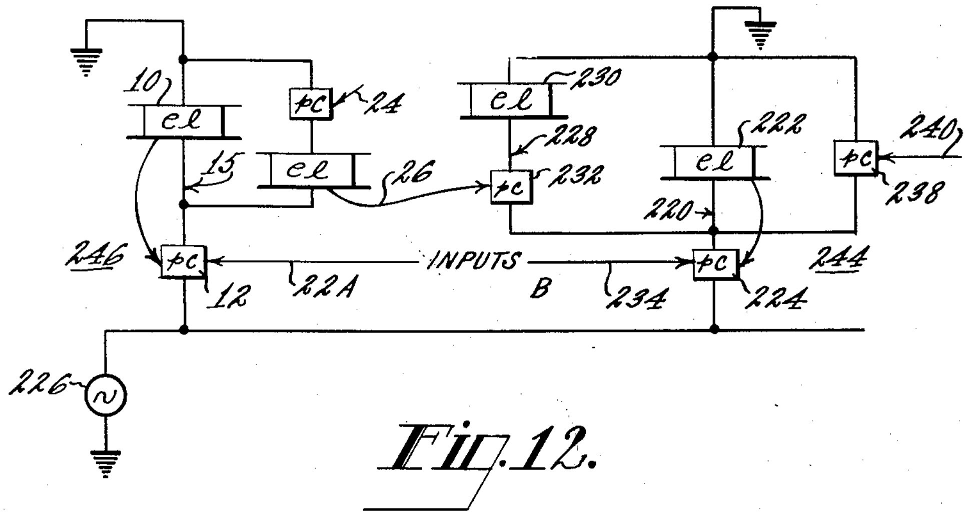
Figure 12 is a schematic circuit diagram of a two-input "and" circuit embodying this invention.
Figure 13:
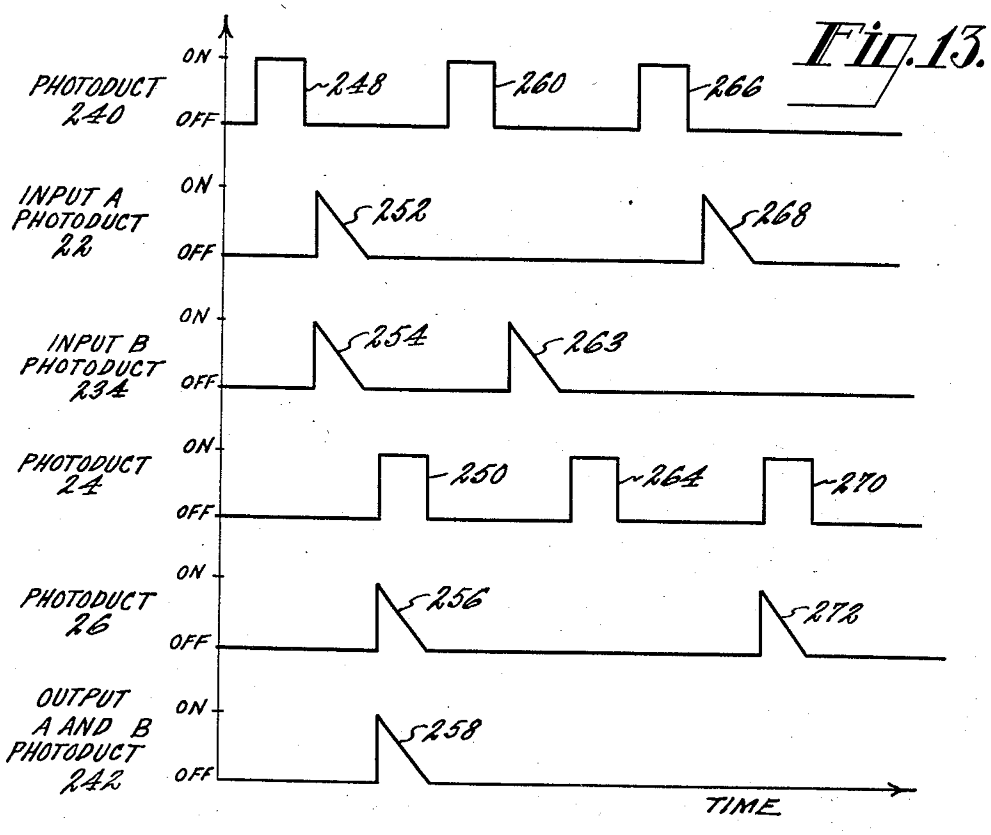
Figure 13 is an idealized graph of the time relationship of operations occurring in certain portions of the circuit of Figure 12.

In Figure 12, a circuit is shown for carrying out the logic operation known as "and." The circuit of Figure 12 is also known as a coincidence circuit. The graph of Figure 13 shows in somewhat idealized form the time relationships of the passage of radiations in certain photoducts of the circuit of Figure 12. The circuit of Figure 12 includes a "negation" unit 244 of the type described above with respect to Figure 10; parts corresponding to those previously described are referenced by the same numerals. The circuit of Figure 12 also includes a basic binary element 246 of the type described above with respect to Figure 1, which binary element 246 includes the series combination 15 and the shunt combination 17. The output photoduct 26 of the shunt 17 is connected to apply radiation to the *pc* cell 232 of the shunt combination 228.

Input radiation signals A and B are respectively applied to the input photoducts 22 and 234 of the two units 246 and 244. Periodic radiation pulses 250 and 248 (Figure 13) are respectively applied to the photoducts 24 and 240 of the units 246 and 244, respectively.

In operation, it is assumed that the two units 244 and 246 are initially in the off-condition, and that the time relationship of the periodic pulses is that shown in Figure 13. The first pulse to be received by the circuit of Figure 12 is a pulse 248 in photoduct 240. This pulse 248 has no effect on the negation unit 244 because that unit 244 is already in the off-condition. It is assumed that radiation pulses 252 and 254 for the inputs A and B are then respectively received at the input photoducts 22 and 234. These input pulses 252 and 254 have the effect of turning both units 244 and 246 to the on-condition. The next periodic pulse is the pulse 250 in the photoduct 24 to turn the unit 246 to the off-condition, which operation produces momentarily a transfer pulse 256 on the transfer photoduct 26. This pulse 256 is applied to the *pc* cell 236 in the shunt combination 228, to turn the negation unit 244 to the off-condition. As the negation 244 is driven to the off-condition, an output pulse is generated by the *el* cell 230 in the output photoduct 242. This output pulse 258 represents the input condition of pulses being received at both input photoducts 22 and 234.

The next pulse 260 (Figure 13) received in the photoduct 240 has no effect on the negation unit 244, because again that unit 244 is already in the off-condition. In this cycle, the B input (Figure 13) is assumed to be a pulse 262 on the photoduct 234, and the A input, the absence of a pulse in the photoduct 22. With these inputs, the negation unit 244 is in the on-condition, and the unit 246 is in the off-condition. The next periodic pulse 264 applied to the photoduct 24 has no affect on the unit 246, because that unit is already in the off-condition. Accordingly, no radiation pulse is generated in the photoduct 26. Consequently, the negation unit 244 remains in the on-condition during the pulse 264 and no output pulse is generated in the photoduct 242.

The next periodic pulse 266 in the photoduct 240 finds the negation unit 244 in the on-condition. This pulse 266 drives the unit 244 to the off-condition; however, there is no effect on the shunt combination 228, and no output pulse is generated at this time.

The next input combination is assumed to be a pulse 268 (Figure 13) in the A input 22 and the absence of a pulse in the B input 234. These inputs place the unit 246 in the on-condition and leave the negation unit 244 in the off-condition. The next pulse 270 in the photoduct 24 restores the unit 246 to the off-condition, and generates a pulse 272 in the photoduct 26. This transfer pulse 272 has no effect on the series combination 228 because the unit 244 is already in the off-condition. Accordingly, no output pulse is generated in the photoduct 242. Thus, the circuit of Figure 12 operates to generate an output pulse if, and only if, input pulses are applied to both circuit inputs.

Figure 14:
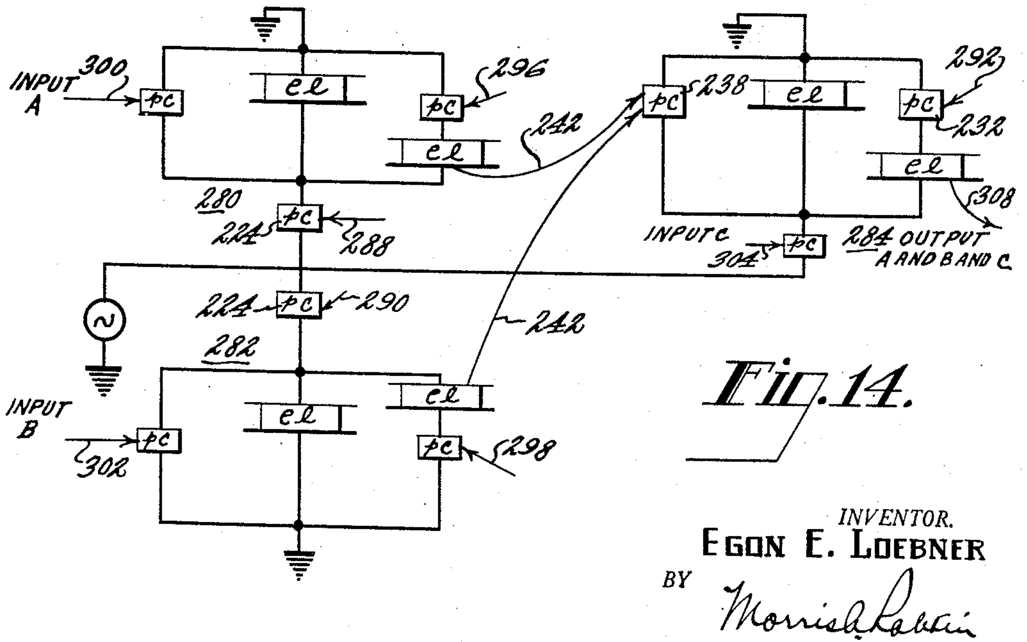
Figure 14 is a schematic circuit diagram of a three-input "and" circuit embodying this invention.

In Figure 14, a three-input "and" circuit is shown. Three negation units 280, 282, and 284 of the type described above with respect to Figure 10 are used. These units are coupled so that output radiation in the photoduct 242 of each unit 280 and 282 are directed to the shunt *pc* cell 238 of the unit 284 (parts corresponding to those previously described are referenced by the same numerals).

Figure 15:
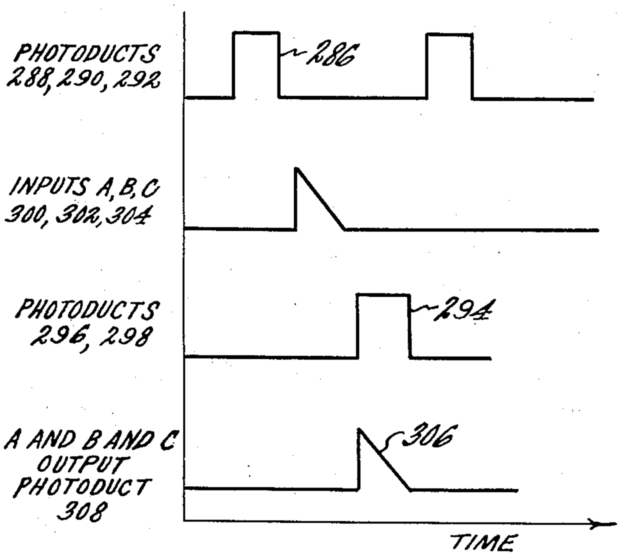
Figure 15 is an idealized graph showing the time relationship of operations occurring at certain portions of the circuit of Figure 14.

Figure 15 shows graphically the idealized time relationship of radiation passages in certain photoducts of the system of Figure 14. Periodic pulses 286 (Figure 15) are applied simultaneously to the photoducts 288 and 290 in the units 280 and 282, respectively, and to the photoduct 292 of the unit 284. Periodic pulses 294 are applied to the photoducts 296, 298 of the units 280 and 282, respectively (the phase relationship of the pulses 286 and 294 is shown in Figure 15). As shown in Figure 15, input signals A, B, and C are applied to the input photoducts 300, 302, and 304 of the units 280, 282, and 284, respectively, in the time between the pulses 286 and 294.

In operation, an output pulse 306 (Figure 15) is generated in the output photoduct 308 when the unit 284 is driven from the on- to the off-condition by a pulse 286 in the photoduct 292. This situation occurs if, and only if, radiation pulses are received at all three input photoducts 300, 302, and 304. If the C input is the absence of a radiation pulse in the photoduct 304, the unit 384 remains in the off-condition. As a result, the next periodic pulse 286 applied to the photoduct 292 does not change the condition of the unit 284, and no output radiation pulse is generated in the photoduct 308.

If the C input is a radiation pulse, turning the unit 284 to the on-condition, and the A input is the absence of a pulse, the unit 280 remains in the on-condition, which on-condition was produced by the preceding periodic pulse 286 applied to the photoduct 288. The next periodic pulse 294 applied to the photoduct 296 turns the units 280 to the off-condition, which action generates a transfer pulse in the photoduct 242. This transfer pulse in the photoduct 242 turns the negation unit 284 to the off-condition. Consequently, when the next periodic pulse 286 is applied to the photoduct 292, the unit 284 is already in the off-condition and no output pulse is generated in the photoduct 308. If the B input is the absence of a radiation pulse, there is a similar operation which prevents the generation of an output pulse in the output photoduct 308.

However, if the A, B, and C inputs are all pulses, the negation unit 284 is driven to the on-condition and remains in that condition until restored to the off-condition by a pulse 286 in the photoduct. This latter operation produces a pulse 306 in the output photoduct 308, which output pulse 306 marks the presence of pulses for all three inputs.

Figure 16:
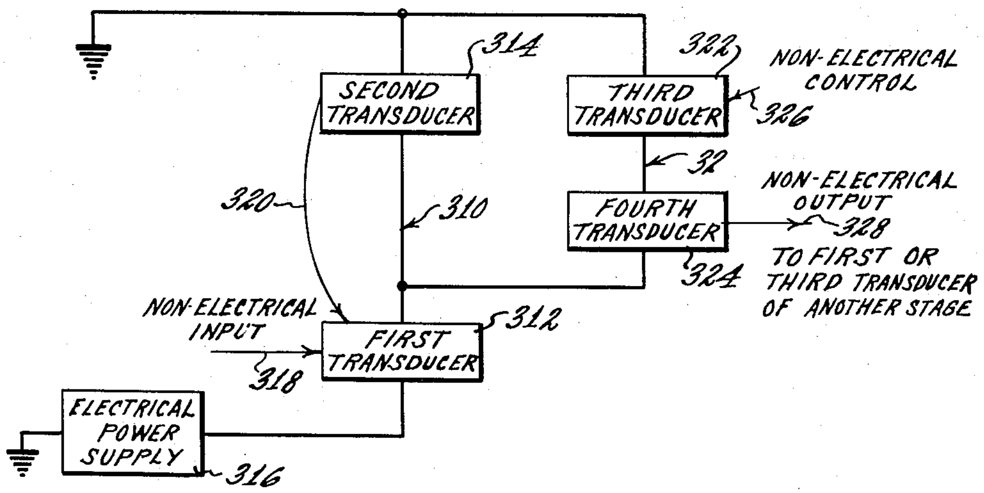
Figure 16 is a schematic circuit diagram of a binary element embodying this invention employing transducers for receiving and generating non-electrical power signals.

The principles of this invention are not restricted in their application to transducing devices of the radiant-energy type, that is, devices which are responsive to radiation for producing changes in the conductance, such as a photoconductor element, and devices which are responsive to variations in electrical energy for producing variations in radiation energy, such as an electroluminescent cell. In Figure 16, the principles of this invention are shown embodied in a system that employs transducers receiving non-electrical inputs (that is, inputs that are not purely voltages or currents) and producing non-electrical outputs.

In Figure 16, a first electrical series combination 310 includes a first transducer 312 and a second transducer 314, the combination 310 being connected in series with an electrical power supply 316. The first transducer 312 is a device responsive to input signals in an energy form other than electrical, which input signals are received via the input 318. This transducer 312 is operable for controlling larger amounts of power in electrical form in accordance with the power of the signals received at the input 318. This first transducer 312 operates to provide a variable impedance to the electrical power supplied by the supply 316 in response to the non-electrical signals received at the input 318 and with the impedance varying inversely as the input signals. The second transducer 314 operates to convert electrical power to the input form of non-electrical power. The second transducer 314 supplies the non-electrical power to the first transducer 312 by way of a feedback coupling 320.

The operation of the first and second transducers is such that that the feedback power by way of the coupling 320 is regenerative: As the power at the input 318 increases, the impedance of the first transducer 312 decreases, the power supplied to the transducer 314 increases, and the feedback power at the coupling 320 likewise increases. Due to gain in the system, sufficient power is fed back via the coupling 320 to maintain the combination 310 in the on-condition after the input terminates. Accordingly, the combination 310 of transducers 312 and 314 remains in a stable on-condition once input energy is momentarily supplied by way of the coupling 318 to the first transducer to complete the regenerative feedback through the coupling 320.

A second series combination 320 includes a third transducer 322 and a fourth transducer 324 connected electrically in series, which combination 320 is in shunt to the second transducer 314. The third and fourth transducers 322 and 324 may be of the same general types as the first and second transducers 312 and 314, respectively. The third transducer 322 receives non-electrical control signals by way of a coupling 326. The fourth transducer 324 supplies non-electrical output signals to the coupling 328, which coupling 328 may be a coupling to the first or third transducers (not shown) of another stage similar to the one shown in Figure 16.

In operation, the shunt series combination 320, in the absence of non-electrical control power signals via the coupling 326, provides a high shunt impedance to the second transducer 314. Under those circumstances, the shunt combination 320 does not affect the operation of the series combination 310. Thus, the combination 310 remains in the on-condition once it has been placed in that condition by input power signals via the input 318.

However, when non-electrical control power signal is supplied to the coupling 326, the third transducer is changed to a low impedance condition, and there is substantial current flow in the shunt impedance combination 320. The current flow through the fourth transducer 324 energizes that transducer to generate power signals in non-electrical form similar to those generated by the second transducer 314.

The current flow diverted to the shunt combination 320 tends to reduce the current flow supplied to the second transducer 314. This reduction in current to the second transducer 314 reduces the power fed back by way of the coupling 320 to increase the impedance of the first transducer 312. Due to the gain in the transducer 312, this action is regenerative in a direction to turn the series combination 310 to the off-condition. When the first transducer is returned to the high impedance condition, current flow through the shunt combination 320 is reduced to a negligible amount terminating the power signal supplied to the output coupling 328.

Accordingly, the circuit of Figure 16 operates to provide a binary element which is turned to an on-condition in response to non-electrical input power signals. This circuit is returned to an off-condition in response to non-electrical control power signals supplied to a third transducer 322 and in shunt with the second transducer 314. In the course of turning the circuit to the off-condition, the fourth transducer 324 is momentarily energized to produce an impulse of non-electrical power signals at the output coupling 328.

Figure 17:
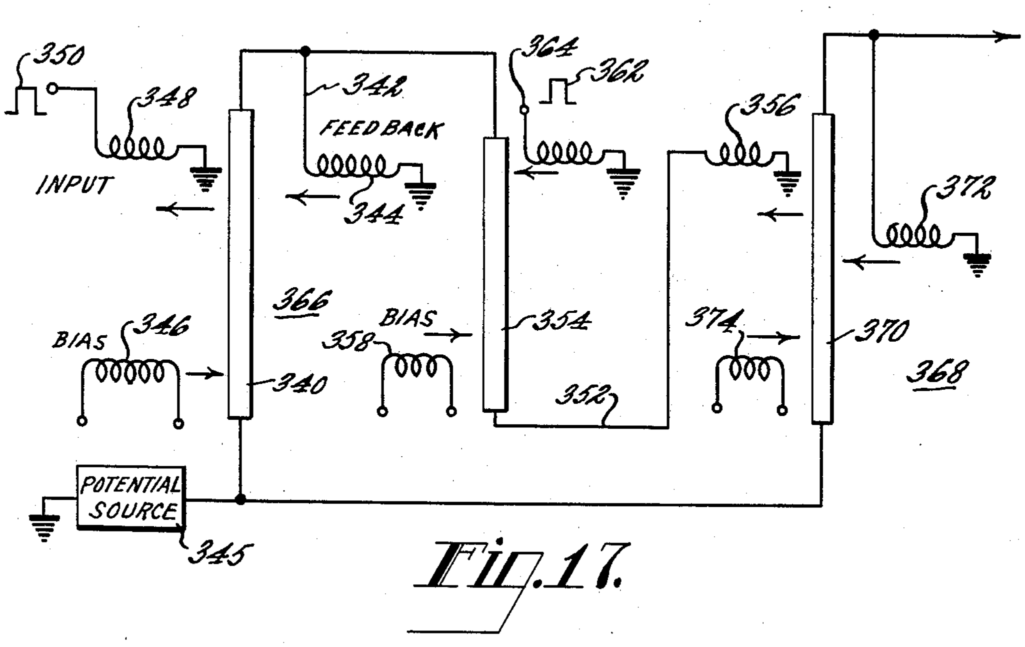
Figure 17 is a schematic circuit diagram of a shift register circuit embodying this invention using magnetoresistive elements.

In Figure 17, a portion of a shift register circuit embodying this invention is shown which is based upon binary elements that utilize the physical phenomenon of magnetoresistivity, that is, the resistance of certain conductors or semiconductors vary in response to variations in an applied magnetic field. Circuits, such as an amplifier making use of this physical phenomenon are described in an article "The Gaussistor, A Solid State Electronic Valve" by M. Green, in the I.R.E. Transactions on Electron Devices, vol. ED-3, No. 3, July 1956, at page 133. As described in that article, magnetic fields may be applied to a conductor which is held at a certain temperature, and by increasing and decreasing the intensity of the magnetic field above and below a certain threshold value, the resistance of the material of the conductor is caused to shift from a low to a high resistance state and back, respectively.

In Figure 17, an electrical conductor element 340, of a magnetoresistive material, such as indium antimonide or bismuth, as described in the last-mentioned article, is connected in a series combination 342 with a winding 344, which is linked magnetically to the element 340. A source 345 of operating potential is connected across the series combination 342. The winding 344 is linked magnetically to the conductor element 340 to apply a magnetic field to that conductor element 340 in accordance with the current flow in the series combination 342. A bias magnetic field is applied to the conductor element 340 by appropriate means, such as by a winding 346 and a suitable direct current source (not shown). A third input winding 348 is also linked magnetically to the conductor element 340. Energizing current pulses 350 are applied to the input winding 348.

A second series combination 352 includes a second magnetoresistive conductor element 350 and a winding 356. This second series combination 352 is connected electrically in shunt to the coil 344. Linked to the conductor element 354 is a bias winding 358 which is energized by a suitable direct current source (not shown), and a control winding 360 that receives control or shift current pulses 362 at the terminal 364.

The circuit described thus far except for the winding 356 makes up a first stage 366. A second stage 368 includes a magnetoresistive conductor element 370 connected in series with the power supply 345 and a feedback winding 372 linked magnetically to the conductor element 370. The conductor element 370 also has linked to it a bias winding 372 energized by a direct current source (not shown) and an input winding that is the winding 356 of the shunt combination 352. Other parts (not shown) complete the stage 368 to a substantial duplicate of the stage 366.

Figure 18:
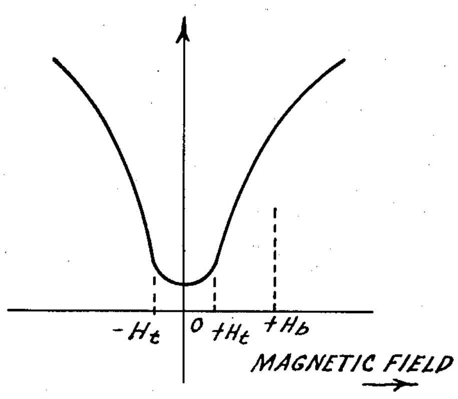
Figure 18 is an idealized graph of a characteristic of elements used in the circuit of Figure 17.

The magnetoresistive elements are maintained at an ambient temperature in which there is a large change in resistance with change in field strength. In Figure 18, an idealized graph indicates such a magnetoresistive characteristic of the conductor elements 340, 354, 370 in going from low resistance to a relatively high resistance as a bias magnetic field $H_b$ is supplied greater than a threshold magnetic field $H_t$. A similar characteristic of a relatively high resistance exists when a magnetic field is applied in the opposite direction whose absolute magnitude is greater than the absolute magnitude of $-H_t$.

In Figure 17, each of the conductors 340, 354, and 370 is assumed to be in the high resistance condition due to a bias magnetic field $H_b$ applied by the windings 346, 358, and 372, respectively. Under these conditions, the conductors 340, 354, 370 are in a high-resistance condition. Therefore, there is but a small current in the series circuit 342, and the magnetic field due to the winding is likewise small compared to the bias field $H_b$. A current pulse 350 applied to the input winding 348 causes a magnetic field to be applied to the conductor element 340 in the opposite or negative direction, as indicated graphically in Figure 18. The magnitude of the input magnetic field is such that there is a resultant magnetic field applied to the element 340 that is less than the threshold magnitude $H_t$. Consequently, the element 340 is in the low resistance state, and a substantial current flows through that element 340 to energize the winding 344. This winding 344 is linked in regenerative feedback relationship to the element 340, so that the current flow through the winding 344 is such as to produce a magnetic field in the same direction as the input magnetic field, that is, a field that opposes the bias magnetic field $H_b$.

When the input pulse 350 terminates, the element 340 continues in the low-resistance state, and the feedback winding 344 continues to be energized. The current through the feedback winding 344 is such as to maintain the element 340 in the low-resistance state. The absolute magnitude of the resultant magnetic field applied by all three windings 346, 348, and 344 (and any magnetic field due to current flow directly through the element 340) should not exceed the absolute magnitude of the threshold field $H_t$ during the input pulse 350 to ensure that the element 340 remains in the low-resistance condition. Thus, an input pulse 350 drives the series combination 342 to the on- or conducting-condition.

The series combination 342 continues in the conducting-condition until a shift pulse is received. When a shift pulse 362 is applied to the control winding 360 of the conductor element 354, the bias field applied to the winding 358 is effectively neutralized to reduce the resultant field applied to the element 354 to an absolute value below the absolute value of the threshold $H_t$. Consequently, the element 354 is driven to the low-resistance condition, and current is drawn therethrough and through the coil 356 that completes the shunt combination 352.

This diversion of current through shunt combination 352 from the feedback winding 344 is sufficient to reduce substantially the neutralizing magnetic field provided by the feedback winding 344, and to produce a net magnetic field whose absolute magnitude is greater than the threshold $+H_t$. Thus, the series combination is regeneratively restored to the high-resistance, or non-conducting, condition.

The momentary energization of the winding 356 during the time that shunt current passes through the combination 352, the time that the combination 342 is being restored to the resistive condition, is sufficient to overcome the bias of the winding 372 on the element 370. Thus, the element 370 is driven to the low-resistance condition to energize the feedback winding 372. The action is regenerative in the manner described above, and the stage 370 is driven to the on-condition. The stage 368 remains stably in that on-condition until the winding 372 is shunted by current through a shunt combination (not shown) in the stage 368, which shunt combination is of the same type as that described for the stage 366.

The shift register of Figure 17 may be extended to as many stages as desired, and the operation of each stage is similar to that described. These stages may be employed in various configurations of the type described above with respect to the *el-pc* type of shift register.

Accordingly, a new and improved information handling system is provided in which the information signals are in a form of power other than electrical. Particularly, this information handling system of the invention may be used to handle information signals in which the input or output is in the form of visible or near-visible radiation.

What is claimed is:

1. In apparatus of the class described, the combination comprising a first and a second electrical series combination, each of said series combinations including a first and a second transducing device connected in series, means for electrically energizing said first series combination, means for connecting said second series combination electrically in shunt to said first series combination second device, and separate means for respectively applying different input power signals of a certain energy form to said first devices, each of said first devices including means having a gain characteristic for providing an electrical impedance that varies in accordance with said input power signals, each of said second devices including means responsive to electrical energization for accordingly generating power signals of said certain energy form, said first series combination first device regeneratively receiving energy from said first combination second device.

2. In apparatus of the class described, a device comprising a first and a second electrical series combination, each of said combinations including a first and a second transducing device, means for electrically energizing said first combination, means for connecting said second combination electrically in shunt to said first combination second device, separate means for respectively applying different input power signals of a certain energy form to said first devices, each of said first devices including means having a gain characteristic for providing an electrical impedance that varies in accordance with said input power signals, each of said second devices including means responsive to electrical energization for accordingly generating power signals of said certain energy form, and means for regeneratively applying said generated power signals of said first combination second device to said first combination first device.

3. In apparatus of the class described, the system comprising a plurality of stages, each of said stages individually including a first and a second electrical series combination, each of said combinations including a first and a second transducing device, means for electrically energizing said first combination, means for connecting said second combination electrically in shunt to said first combination second device, separate means for respectively applying different input power signals of a certain energy form to said first devices, each of said first devices including means having a gain characteristic for providing an electrical impedance that varies in accordance with said input power signals, each of said second devices including means responsive to electrical energization for accordingly generating power signals of said certain energy form, and means for regeneratively applying said generated power signals of said first combination second device to said first combination first device, said system further comprising means for applying said generated power signals to said second combination second device of a first one of said stages to said first combination first device of a second one of said stages.

4. An opto-electronic device comprising a plurality of radiation generating means, a plurality of radiation responsive means providing variable impedances, means for energizing a first electrical series combination that includes a first one of said radiation generating means and a first one of said variable impedance means, means for connecting a second one of said radiation generating means and a second one of said variable impedance means in a second electrical series combination, and means for connecting said second combination electrically in parallel with said first radiation generating means, said first combination radiation responsive means being arranged to receive the radiation of said first combination radiation generating means.

5. An opto-electronic device comprising a plurality of stages; each of said stages individually including a plurality of radiation generating means, a plurality of radiation responsive means providing variable impedances, means for energizing a first electrical series combination that includes a first one of said radiation generating means and a first one of said variable impedance means, means for connecting a second one of said radiation generating means and a second one of said variable impedance means in a second electrical series combination, and means for connecting said second combination electrically in parallel with said first radiation generating means, said first combination radiation responsive means being arranged to receive the radiation of said first combination radiation generating means; said device further comprising means for coupling said second combination radiation generating means of a first one of said stages to one of said variable impedance means of a second one of said stages.

6. An electroluminescent device comprising a plurality of electroluminescent elements, a plurality of photoconductive elements, means for energizing a first electrical series combination that includes a first one of said electroluminescent elements and a first one of said photoconductive elements arranged to receive radiant energy from said first electroluminescent element, means for connecting a second one of said electroluminescent elements and a second one of said photoconductive elements in a second electrical series combination, and means for connecting said second combination electrically in parallel with said first electroluminescent element.

7. An electroluminescent device comprising a plurality of stages; each of said stages including individually a plurality of electroluminescent elements, a plurality of photoconductive elements, means for energizing a first electrical series combination that includes a first one of said electroluminescent elements and a first one of said photoconductive elements arranged to receive radiant energy from said first electroluminescent element, means for connecting a second one of said electroluminescent elements and a second one of said photoconductive elements in a second electrical series combination, and means for connecting said second combination electrically in parallel with said first electroluminescent element; said device further comprising means for optically coupling said second combination electroluminescent element of a first one of said stages to one of said photoconductive elements of a second one of said stages.

8. An electroluminescent device comprising a plurality of electroluminescent elements, a plurality of variable impedance elements responsive to radiation, means for connecting a first one of said electroluminescent elements and a first one of said variable impedence elements in a first electrical series combination, means for regeneratively applying radiation from said first combination electroluminescent element to said first combination variable impedance element, means for applying an operating potential across said first series combination whereby impedance values of said first impedance element tend to determine the magnitude of operating potential across said first electroluminescent element and the amount of radiation produced thereby, means for connecting a second one of said electroluminescent elements and a second one of said variable impedance elements in a second electrical series combination, means for connecting said second combination electrically in parallel with said first electroluminescent element whereby increases and decreases respectively of the impedance values of said second impedance element tend to decrease and increase respectively the amount of radiation produced by said second electroluminescent element and tend to increase and decrease respectively the amount of radiation produced by said first electroluminescent element.

9. A display apparatus comprising a plurality of first shift registers, each having a plurality of stages serially coupled to transfer signals in one direction, a second shift register having a plurality of stages serially coupled to transfer signals in the second direction, and means coupling a stage of each different one of said first registers to a different stage of said second register to transfer signals from said second register to said first register, each of said register stages including a first separate radiation generating means, a first separate radiation responsive means connected electrically in series with said generating means, a second separate radiation generating means, and a second separate radiation responsive means connected electrically in series with said second radiation generating means, the series connection of said second radiation generating and responsive means being connected electrically in parallel with the said first radiation generating means, and means for applying radiation from said first radiation generating means to said first radiation responsive means.

10. A display apparatus comprising a plurality of first shift registers, each having a plurality of stages serially coupled to transfer signals in one direction, a second shift register, having a plurality of stages serially coupled to transfer signals in a second direction, and means coupling a stage of each of said first registers to a different stage of said second register to transfer signals from said second register to said first register, each of said register stages including a plurality of radiation generating means, a plurality of radiation responsive means providing variable impedances, means for energizing a first electrical series combination that includes a first one of said radiation generating means and a first one of said variable impedance means, means for applying radiation from said one radiation generating means to said one variable impedance means, means for connecting a second one of said radiation generating means and a second one of said variable impedance means in a second electrical series combination, and means for connecting said second combination electrically in parallel with said first radiation generating means.

11. An opto-electronic device comprising a plurality of stages, each of said stages individually including a plurality of radiation generating means, a plurality of radiation responsive means each providing a variable impedance, means for energizing a first electrical series combination that includes a first one of said radiation generating means and a first one of said variable impedance means, means for applying radiation from said one radiation generating means to said first one variable impedance means, means for connecting in a series circuit a second one of said radiation generating means and a second one of said radiation responsive means, means for connecting said series circuit in parallel with said first radiation generating means, said device further comprising means for coupling said second radiation generating means of a first one of said stages to said first one variable impedance means of a second one of said stages.

References Cited in the file of this patent

"Opto-Electronic Devices and Networks" (Loebner), Proceedings of the I.R.E., December 13, 1955.

"The Phenomenon of Electro-luminescence and Its Application in the Electronics Industry" (Ballentyne), Marconi Review, Fourth Quarter, 1956, pp. 160–175.

Fellowship on Computer Components No. 347, Mellon Institute of Industrial Research, 1951, pp. VI–9, VI–10 and Fig. VI–4.